C. Russell.
Shaft Coupling.
Nº 92649. Patented July 13. 1869
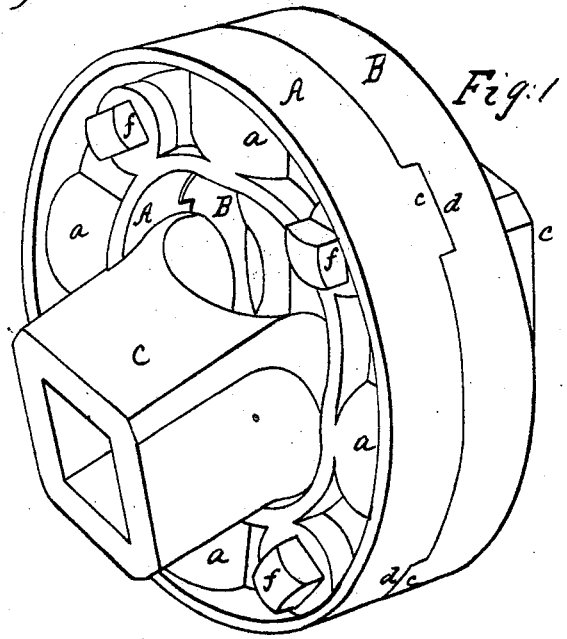
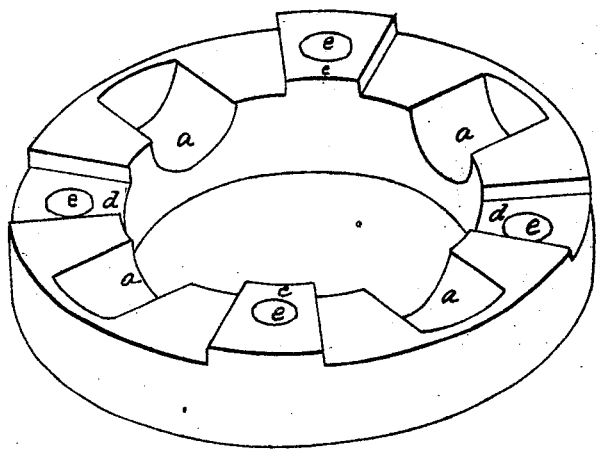
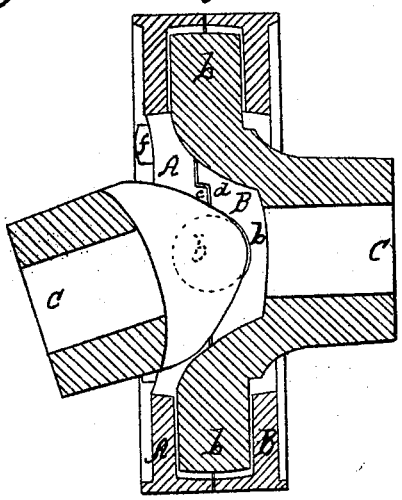
Witnesses.
Chas C Wilson
Edmund Masson
Inventor.
Clement Russell
By atty A. B. Stoughton

United States Patent Office.

CLEMENT RUSSELL, OF MASSILLON, OHIO.

Letters Patent No. 92,649, dated July 13, 1869.

IMPROVED SHAFT-COUPLING.

The Schedule referred to in these Letters Patent and making part of the same.

*To all whom it may concern:*

Be it known that I, CLEMENT RUSSELL, of Massillon, in the county of Stark, and State of Ohio, have invented certain new and useful Improvements in "Tumbling-Rod" Couplings for Horse-Powers and other Machinery; and I do hereby declare the following to be a full, clear, and exact description of the same, reference being had to the accompanying drawings, making a part of this specification, in which—

Figure 1 represents a perspective view of the coupling.

Figure 2 represents a section through the same.

Figure 3 represents a plan of the interior face of the coupling-plates, which support and enclose the journals and bearings of the yielding sockets or heads.

As heretofore constructed, these tumbling-rod couplings have had projecting corners or bolts on their exterior, by which the attendants on the machine are frequently injured by their clothes catching thereon, and their being wound against the coupling-rod or machine with great violence. Besides, where the connecting-devices are thus exposed, they are liable to fly off under any disarrangement of the parts, and cause injury to the attendants or to the team.

The object and purpose of my invention are to enclose all of such parts of the coupling as are liable to cause accidents, as above stated, whereby all casualties that have heretofore occurred are perfectly guarded against; and My invention consists in a coupling composed of two cast plates, firmly united together by bolts, which do not, or need not project beyond the rims of said plates, and by dovetails or otherwise, and in which plates are cast one-half of the several bearings that receive and hold enclosed, when put together, the journals or trunnions upon the sockets or heads that receive the ends of the shafts coupled by them, said journals being so secured within closed chambers or bearings as not to present any exterior projections or points, and which could not leave their bearings if by any accident they should become broken.

To enable others skilled in the art to make and use my invention, I will proceed describe the same with reference to the drawings.

A B represent two cast-iron plates, with semicircular recesses $a\, a\, a\, a$, cast in their adjacent faces that are laid together when united, so that said recesses of the two plates, when matched or laid together, shall form close chambers or bearings for the journals $b\, b$ of each the two heads or sockets C C that are to receive and thus couple the shafts through which the power is to be transmitted.

On the faces of the plates A B are also cast alternate projections $c$, and correspondingly-shaped recesses $d$, which fit one in or against the other, and through said plates are bolt-holes $e$, for receiving the through-bolts $f\, f$ that hold said plates together, and neither the heads, points, nor the nuts of said bolts project beyond the rims of the plates, so that there is nothing to catch into the clothing of the attendants about the machine, or to wind or draw them thereto.

The sockets C must have some toggle or yielding motion, as it would be almost impossible to so "line" the shafting and support it as to make it run true, and without cramping or binding, and consequent cutting, wearing, and friction of the gearing.

The adjacent ends of the two sockets are so formed, and their journals or trunnions $b\, b$ so made and projected therefrom, as that said journals are all in the same plane, and of course have their motions, or turning, or yielding in the same plane, which prevents undue strain upon the coupling-plates.

The journals of the sockets are properly placed in the circular recesses of one of the plates, and then the other plate is laid in its proper position, and the bolts passed through and tightened up, and the coupling is united.

The openings in the sockets are made square, but any other angular form will answer the purpose.

Having thus fully described my invention,

What I claim therein as new, and desire to secure by Letters Patent, is—

A "tumbling-rod" coupling, composed of the two bearing-plates and two journalled sockets or heads united together, as represented, so as to have a yielding motion, and the journals thereof covered, in the manner and for the purpose described.

CLEMENT RUSSELL.

Witnesses:
WM. McKINLEY, Jr.,
W. H. WYANT.